United States Patent [19]

Sullivan et al.

[11] Patent Number: 5,080,718
[45] Date of Patent: Jan. 14, 1992

[54] INORGANIC PIGMENTS OF THE EMPIRICAL FORMULA $A_xB_yC_z$

[75] Inventors: Thomas J. Sullivan, Strongsville; Deepak S. Thakur; Brian D. Roberts, both of Solon; Mark E. Gall, Cleveland Hts.; Eugene Palka, Parma, all of Ohio

[73] Assignee: Engelhard Corporation, Edison, N.J.

[21] Appl. No.: 315,406

[22] Filed: Feb. 23, 1989

[51] Int. Cl.$^5$ .................. C09C 1/00; C09C 1/22; C09C 1/34
[52] U.S. Cl. .................. 106/453; 106/401; 106/456; 106/480
[58] Field of Search .............. 106/401, 419, 420, 425, 106/452, 453, 456, 459, 480; 423/593

[56] References Cited

U.S. PATENT DOCUMENTS

| | | | |
|---|---|---|---|
| 2,068,294 | 1/1937 | Korinth et al. | 134/53 |
| 2,248,021 | 7/1941 | Geary | 106/302 |
| 2,264,749 | 12/1941 | Geary | 106/292 |
| 2,269,508 | 1/1942 | Barton | 23/52 |
| 2,309,173 | 1/1943 | Diehl | 106/302 |
| 2,416,064 | 2/1947 | Patterson et al. | 106/302 |
| 2,644,767 | 7/1953 | Duncan | 106/292 |
| 2,755,257 | 7/1956 | Donovan | 423/593 |
| 2,811,463 | 10/1957 | Burgyan | 106/304 |
| 2,904,395 | 9/1959 | Downs | 106/419 |
| 3,198,646 | 8/1965 | Eide | 106/419 |
| 3,443,888 | 5/1969 | Calbeck | 106/420 |
| 3,748,165 | 7/1973 | Hill | 106/300 |
| 3,935,128 | 1/1976 | Fein et al. | 252/467 |
| 4,075,029 | 2/1978 | Nuss | 106/453 |
| 4,230,500 | 10/1980 | Balducci et al. | 106/288 B |
| 4,231,231 | 11/1980 | Lawless | 106/452 |
| 4,292,294 | 9/1981 | Patal et al. | 106/419 |
| 4,629,513 | 12/1986 | Ostertag et al. | 106/425 |
| 4,643,772 | 2/1987 | Gaedcke et al. | 106/304 |
| 4,680,130 | 7/1987 | Hibst | 106/459 |
| 4,696,700 | 9/1987 | Fischer et al. | 106/291 |
| 4,780,140 | 10/1988 | Franz et al. | 106/459 |
| 4,826,537 | 5/1989 | Ostertag | 106/459 |
| 4,840,677 | 6/1989 | Ostertag | 106/459 |
| 4,867,795 | 9/1989 | Ostertag et al. | 106/459 |

FOREIGN PATENT DOCUMENTS

| | | | |
|---|---|---|---|
| 557912 | 5/1958 | Canada | 106/419 |
| 372335 | 6/1990 | European Pat. Off. | 106/459 |
| 204147 | 6/1959 | Fed. Rep. of Germany | 106/480 |
| 2625106 | 12/1977 | Fed. Rep. of Germany | 106/419 |
| 57-49667 | 3/1982 | Japan | 106/459 |
| 1149275 | 4/1969 | United Kingdom | 106/419 |

*Primary Examiner*—John J. Zimmerman
*Attorney, Agent, or Firm*—Renner, Otto, Boiselle & Sklar

[57] ABSTRACT

A pigment of irregular-shaped particles is described which comprises crystallites of the empirical formula $A_xB_yC_z$ wherein A and B are different; A is cobalt, nickel, copper, zinc, cadmium, iron, manganese or any combination thereof; B is aluminum, chromium, molybdenum, iron, vanadium, manganese or any combination thereof; C is oxygen, selenium, tellurium or sulfur; x is 1, 2 or 3; y is 2 or 3; and z is greater than 3; the crystallites have an average size of from about 75 to about 600 Angstroms; and the surface area of the pigment particles is greater than zero up to about 20 m$^2$/g. In one embodiment, when the pigment contains a mixture of copper oxide, iron oxide, manganese oxide and no chromium, the pigment contains no more than 10% of manganese, and when the pigment contains copper oxide, chromium oxide, and manganese oxide, the pigment contains up to about 5% of manganese oxide, the mole ratio of chromium to copper is no greater than about 1.3 to 1.

19 Claims, 1 Drawing Sheet

INORGANIC PIGMENTS OF THE EMPIRICAL FORMULA $A_xB_yC_z$

TECHNICAL FIELD

This invention relates to new and improved inorganic pigments of increased tinting strength and characterized as comprising irregular-shaped particles. The invention also relates to a new process for preparing said inorganic pigments.

BACKGROUND OF THE INVENTION

One common method for preparing powdered inorganic pigments comprising one or more metal compound is to intimately admix the powdered components and thereafter calcine the powdered mixture at high temperatures for extended periods such as, for example, for up to 20 or 30 hours or more. In some instances, modifiers and diluents can be incorporated into the mixture to modify and generally improve the properties of the pigments. After the pigments are formed by calcining, the pigments generally are crushed and ground to a fine powder by techniques such as ball milling, wet or dry attrition milling, etc.

The preparation of inorganic pigments comprising two or more metals from solid mixtures is well known and described in the prior art such as in U.S. Pat. Nos. 3,748,165; 2,644,767; 2,269,508; 2,416,064; 2,309,173; 2,068,294 and 4,230,500. The '165 patent describes such procedures for preparing nickel-cobalt aluminate pigments, and the '508 patent describes the preparation of zinc aluminate pigments wherein a mixture of zinc oxide and aluminum hydrate is heated to a temperature of 750°–950° C. until the desired zinc aluminate is formed. U.S. Pat. No. 2,644,767 describes the preparation of pigments of the cobalt alumina type.

U.S. Pat. No. 2,416,064 describes chromite ore pigments obtained by heating a mixture of powdered chromite ore and an alkaline earth material such as, slaked lime in an oxidizing atmosphere, and after drying, the mixture is calcined. Black ceramic pigments are described in U.S. Pat. No. 2,309,173. The pigments which are of the copper-chrome type are obtained by heating solid mixtures of the oxides in the presence of certain addition agents or mineralizers including, for example, zinc oxide, cadmium oxide, small amounts of phosphorus acid or compounds yielding $P_2O_5$ on calcination, molybdenum oxide, tungsten oxide, vanadium oxide, etc.

U.S. Patent 2,068,294 describes pigments comprising mixed crystals containing in their lattice construction zinc oxide, at least one oxide of a metal of the fourth group of the periodic system consisting of Si, Zr, Sn and Ti, and at least one coloring oxide of a metal of the group consisting of V, Cr, Mn, Fe, Co, Ni, Cu and U. Pigments are prepared by combining at a temperature between about 800° C. and 1100° C., zinc oxide, at least one oxide of the metals from the fourth group identified above and at least one coloring oxide of a metal of the group identified above.

U.S. Patent 4,230,500 describes pigments consisting essentially of bismuth vanadate of monoclinic structure, bismuth phosphate of monoclinic structure and aluminum phosphate of orthorhombic structure. In the case of yellow and orange-yellow pigments, the pigments also comprise a compound based on $Bi_2O_3$ and $V_2O_5$ with a characteristic X-ray diffraction pattern. The pigments are prepared by calcining, in the presence of air, $BiPO_4$, $Al_2O_3$ and $V_2O_5$ or compounds which generate $Al_2O_3$ and $V_2O_5$ during the calcination.

The incorporation of about 1–5% of metallic cyanides in black copper-chrome pigments is described in U.S. Pat. No. 2,264,749 as improving the utility of the pigment as a graining pigment for decorative printing on vitreous enamels. The pigments are prepared by thoroughly milling the cyanide compound with the copper-chrome pigment.

Inorganic pigments having a spinel structure and having the formula $AB_2O_4$ wherein A is at least one of Co, Ni, Cu, Zn, Cd, Mg, Mn and Fe, and B is at least one of Al, Cr, Fe, Ga, In, La or V is described in U.S. Pat. No. 4,696,700. These pigments reported to be in the form of platelets are obtained by mixing the components with each other in known manner and calcining at a temperature above 1000° C. while continuously moving the mixture during calcination and with further intermixing such as in a rotary kiln or high temperature cyclone. Preferably the mixture of components is prepared by mixing the solid component under wet conditions in order to obtain a homogeneous mixture which is then dried in an oven, ground to reduce the particle size and then calcined.

U.S. Pat. No. 3,935,128 describes improved copper chromite catalysts having high density, low monovalent ion content, high activity and resistance to poisoning. These copper chromite catalysts are prepared by reacting a soluble copper salt with chromic acid or a dichromate in solution in the presence of ammonia and urea to precipitate a copper-chromium-nitrogen complex which is washed, dried and calcined. The patent discloses that the employment of urea as a processing aid results in the formation of a catalyst having a unique structure and the above-identified desirable properties. The catalyst also has large particles which can be washed free of reaction products to improve yields. The calcination of the precipitate may be conducted at temperatures of from about 200° C. to about 1000° C. and more generally at temperatures of from 300° C. to about 475° C. Comparative examples are included in the '128 patent which do not contain any urea, and the properties of the resulting catalysts are compared.

U.S. Pat. No. 2,811,463 describes inorganic black pigments comprising manganese, copper and iron but which are substantially free of chromium. The pigments can be made by directly calcining the oxides or compounds of manganese, copper and iron which yield their oxides on calcination, or the pigments may be prepared by coprecipitating the pigment and then calcining the precipitate. In either case the calcined pigment comprises 20 to 80 parts by weight of MnO, 20 to 80 parts by weight of CuO and 5 to 50 parts of FeO. Calcination temperatures of 800° F. to 1400° F. are utilized. This patent teaches that chromium is to be avoided because it decreases the tinting strength of the pigment.

U.S. Pat. No. 2,248,021 also relates to black pigments which are high chrome copper-chrome pigments which may also contain up to about 5% by weight of $MnO_2$. The $MnO_2$ is reported to make the black less bluish and more brownish in color. The mole ratio of the chromium to copper in the pigments is from 1.5:1 to 2.5:1.

U.S. Pat. No. 4,643,772 describes the process of the preparation of a mixed phase pigment based on iron oxide and chromium oxide by heating a mixture of the oxides, hydroxides or oxide hydroxides of iron and chromium at from 600° C. to 1100° C., comminuting the product and working it up in a conventional manner. In particular, the process involves dissolving a chromium salt in a neutral suspension of transparent iron oxide in water and thereafter adding an alkali to the mixture whereby chromium hydroxide is precipitated onto the transparent iron oxide which is then calcined and wet-milled in a ball mill. In Example 1, the ball-milled product is subsequently milled in a turbomill.

Although pigments prepared by prior art techniques provide desirable and useful properties, the search for pigments having greater or higher tinting strength continues. Also, while various pigments have been used widely to color various substrates for many years, the use of pigments in formulations intended for long term outdoor exposure has increased the demands placed on the pigments. For example, the use of pigments in prefinished building siding requires that the pigment exhibit long-term resistance to fading by virtue of exposure to sunlight under the usual outdoor exposure. Thus, pigments exhibiting better weatherability and higher tinting strength are of significant interest to the industry.

SUMMARY OF THE INVENTION

A pigment of irregular-shaped particles comprising crystallites of the empirical formula $A_xB_yC_z$ wherein A and B are different; A is cobalt, nickel, copper, zinc, cadmium, iron, manganese or any combination thereof; B is aluminum, chromium, molybdenum, iron, vanadium, manganese or any combination thereof; C is oxygen, selenium, tellurium or sulfur; x is 1, 2 or 3; y is 2 or 3; and z is greater than 3; the crystallites have an average size of from about 75 to about 600 Angstroms; and the surface area of the pigment particles is greater than zero up to about 20 m$^2$/g. In one embodiment, when the pigment contains a mixture of copper oxide, iron oxide, manganese oxide and no chromium, the pigment contains no more than 10% of manganese, and further when the pigment contains copper oxide, chromium oxide, and manganese oxide, the pigment contains up to about 5% of manganese, and the mole ratio of chromium to copper is no greater than about 1.3 to 1.

A process for preparing such pigments also is described which comprises the steps of (1) reacting a soluble salt of A and a soluble acid or acid salt of B in water in the presence of a soluble base to form a precipitate, provided that when C is Se, Te or S, the reaction is conducted in the presence of a soluble Se, Te or S compound, (2) recovering the precipitate, (3) calcining the precipitate at a temperature of from about 500° to about 1200° C., and (4) comminuting the calcined precipitate in a fluid-energy mill wherein the particles are reduced in size by particle-to-particle contact.

DESCRIPTION OF THE PREFERRED EMBODIMENTS

Figure 1:
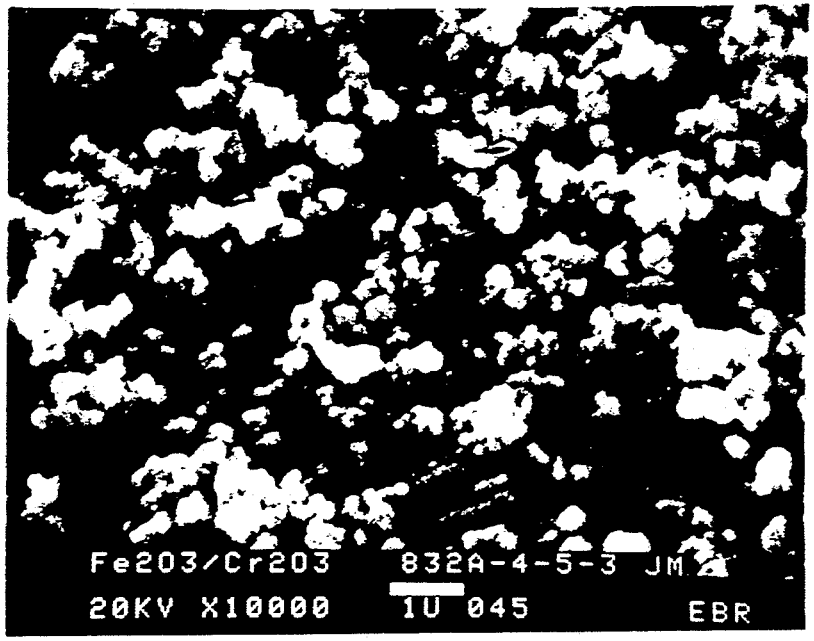
FIG. 1 is a view (magnified 10,000 times) of iron-chromium oxide pigment particles of the invention.

The pigments of the present invention are irregular-shaped particles (as contrast to, for example, platelets) comprising crystallites of the empirical formula $A_xB_yC_z$. A may be cobalt, nickel, copper, zinc, cadmium, iron and manganese or any combination of these metals; B may be aluminum, chromium, molybdenum, iron, vanadium, manganese or any combination of these metals; and C may be oxygen, selenium, tellurium or sulfur and is most generally oxygen. In the above formula, x is 1, 2 or 3; y is 2 or 3; and z is a number greater than 3. In one embodiment, when the pigment contains a mixture of copper oxide, iron oxide, manganese oxide and no chromium, the pigment contains no more than 10% manganese. When the pigment contains copper oxide, chromium oxide and manganese oxide, the pigment contains up to about 5% of manganese, the mole ratio of chromium to copper in the pigment is no greater than 1.3:1. Generally, the chromium to copper mole ratio in copper-chromium oxide pigments is from about 1.3:1 to about 0.8:1. A mole ratio of about 1 to 1 is preferred on one embodiment of the invention.

Typical examples of pigments of the present invention which exemplify the empirical formula $A_xB_yC_z$ include $AB_2C_4$; $AB_3C_4$; $A_2B_2C_5$; $AB_3C_4$; $A_3B_3C_8$; and $A_2B_3C_6$. The value of x, y and z in any particular pigment depends upon the oxidation states of the A and B metals and the A/B ratio.

In the formula $A_xB_yC_z$, A is generally an element in its divalent form and B is an element in its trivalent form. The divalent elements which may be utilized in the preparation of the pigments of the present invention include cobalt, nickel, copper, zinc, cadmium, iron, manganese or any combination of such elements. Examples of trivalent elements include aluminum, chromium, iron, vanadium and manganese.

Specific examples of representative formulae for the crystallites comprising the pigments of the present invention include:

$Cu_2Cr_2O_5$; $Cu_2Mn_2O_5$; $FeCr_3O_6$; $CoFe_3S_4$; $Cd_2Mn_2Se_5$; $Mn_3Al_3Te_8$; $NiV_2O_4$; $Zn_2Mn_3S_6$; $Mn_3V_3O_{14}$; $CoAl_2O_4$.

As noted above, the pigments of the present invention may contain more than one A element and/or more than one B element. For example, pigments can be prepared from the following mixtures of elements: zinc, iron and chromium; cobalt, zinc, chromium and titanium; copper, manganese and chromium; iron, manganese and chromium; copper, titanium and chromium; iron, titanium and chromium; cobalt, zinc, chromium and titanium; etc.

The pigments of the present invention are characterized as having specific physical properties which are different from the properties of known pigments containing similar elements. The pigment particles have irregular or non-symmetrical shape. Generally, the pigments of the invention will not contain any significant amount of symmetrical particles (e.g., less than 5%) as viewed in a scanning electron microscope (SEM). The pigments of the present invention comprise crystallites having an average size of from about 75 to 600 Angstroms. The discussion of the average size of the crystallites throughout this application and claims is based upon a determination of the size by X-ray diffraction line broadening measurements. In one embodiment of the present invention, the crystallites may have average sizes in the range of from about 75 to about 250 Angstroms. The copper-chromium oxide pigments, for example, have an average crystallite size of from about 75 to 250 Angstroms and more particularly from about 100 to 175 Angstroms. In other embodiments, iron-chromium oxide pigment for example, the average crystallite size may be greater such as up to about 600 Angstroms.

The pigments of the present invention comprise pigment particles characterized as having a surface area of greater than zero and up to about 20 m$^2$/g. The surface area of the pigment particles of the present invention may be measured by known techniques, and unless otherwise specified in the present specification and claims, specific values reported for surface area herein are determined by B.E.T. procedures using nitrogen. In one preferred embodiment the surface area of the pigment particles is greater than zero and up to about 10 m$^2$/g. The pigments of the present invention also may be characterized in one embodiment as having a small average particle size and after milling in the fluid energy mills as described more fully below, the pigments of the invention have an average particle size of less than about one micron. Average particle sizes of from about 0.2 to about 0.8 microns are readily achievable. Values for the particle size of pigments which have been comminuted in a fluid energy mill are, unless otherwise indicated herein, determined by Stokes Law sedimentation using a Micromeritics Sedigraph. The particle sizes also are observed to be within a rather narrow range.

The pigments of the present invention include copper-chromium oxide pigments of irregular-shaped particles comprising crystallites of the empirical formula $Cu_2Cr_2O_5$ and containing from zero to about 20% by weight of manganese and/or titanium. The crystallites of such pigments are characterized as having an average size of from about 75 to about 250 Angstroms, and the surface area of the pigment particles is greater than zero up to about 20 m$^2$/g. In one preferred embodiment, the copper-chromium oxide pigment modified with manganese and/or titanium is further characterized as having an average particle size of less than one micron. When titanium or manganese is present, the pigment generally will contain from about 3 to about 12% by weight of the manganese or titanium, and in one preferred embodiment, the pigment contains from about 8 to about 12% by weight of manganese. The presence of manganese oxide in the finished pigment improves the tinting strength and enhances the bluish characteristics of the pigment.

The iron-chromium oxide pigments of the present invention are pigments of irregularly-shaped particles comprising crystallites of the formula $FeCr_3O_6$ wherein such pigments have an average crystallite size from about 100 to about 600 Angstroms, and the particles have a surface area of greater than zero up to about 20 m$^2$/g, and more generally from above zero up to about 10 square meters per gram. When milled in a fluid energy mill as described below, the average particle size of iron-chromium oxide pigments of the invention is less than one micron.

The pigments of the present invention which are characterized generally by the formula $A_xB_yC_z$ wherein A, B and C as defined above can be prepared by the process which comprises the steps of (1) reacting a soluble salt of A and a soluble acid or acid salt of B in water in the presence of a soluble base to form a precipitate provided that when C is Se, Te or S, the reaction is conducted in the presence of a soluble Se, Te or S compound, (2) recovering the precipitate, (3) calcining the precipitate at a temperature of from about 500° C. to about 1200° C., and (4) comminuting the calcined precipitate in a fluid energy mill wherein the particles in the precipitate are reduced in size by particle-to-particle impact.

The particular calcining temperature is determined in part by the nature of elements A and B present in the precipitate, and in most instances, calcination temperatures are between 600° C. and 900° C. Calcination times of from 5 to 30 minutes are sufficient.

Generally, the calcined product is milled to reduce the particle size and it is preferred that the mill is capable of reducing the particle size to below about one micron. A particularly preferred mill is a fluid energy mill wherein the particles are reduced in size by particle-to-particle impact. A useful fluid energy mill is available from the Sturtevant Mill Company, Boston, Mass., and is identified as a "Sturtevant Micronizer". In the micronizer, high-speed, compressed air, gas or steam flow impels particles into rotation near the periphery of the grinding chamber. Centrifugal force maintains oversized material in the grinding area. After reduction in size by particle-to-particle impact, preselected size fines move towards and into a collection chamber in the center driven by centripetal force. Pigments of the invention which have been treated in a fluid energy mill to reduce particle size to below about one micron exhibit further improved tinting strengths.

The soluble salts of A utilized in step (1) in the preparation of the pigments may be, and generally are, hydroxide, sulfate, chloride, nitrate, carbonate or acetate salts, and in one preferred embodiment, the salts of A are the water-soluble salts such as the sulfate, chloride, nitrate and acetate salts.

Specific examples of such salts include, for example, cobalt chloride, cobalt sulfate, cobalt nitrate, copper chloride, copper nitrate, copper sulfate, copper hydroxide, nickel nitrate, nickel sulfate, zinc hydroxide, zinc chloride, zinc nitrate, cadmium nitrate, iron nitrate, iron sulfate, iron hydroxide, iron acetate, manganese nitrate, manganese acetate, etc.

Element B is introduced into the reaction mixture as a soluble acid or acid salt such as the water-soluble alkali metal salts including the nitrates, sulfates, carbonates, etc. Preferably the acid or acid salt is water-soluble. For example, when B is chromium, B can be introduced to the reaction mixture as chromic acid, chromium nitrate, an alkali metal chromate or an alkali metal dichromate.

Other sources of element B which can be utilized in the process of the present invention include aluminum nitrate, ferric nitrate, vandium nitrate, manganese nitrate, sodium molybdate, potassium molybdate, etc.

As noted above, C may be oxygen, selenium, tellurium or sulfur, and when C is selenium, tellurium or sulfur, the reaction is conducted in the presence of a soluble selenium, tellurium or sulfur compound. More particularly, the reaction in such instances is conducted in the presence of, for example, an alkali metal derivative dissolved in water. Aqueous solutions prepared by dissolving $K_2S$, $Na_2S$, $Na_2Se$, $K_2Se$, $Na_2Te$, $K_2Te$, etc., in water may be utilized in the preparation of the pigments.

When pigments are to be prepared wherein C is oxygen, the reaction of the salt of A and a soluble acid or acid salt of B is carried out in water in the presence of a soluble base such as sodium hydroxide, potassium hydroxide, potassium carbonate, sodium carbonate, ammonia, ammonium hydroxide, etc.

When it is desired to prepare a pigment containing more than one metal from Group A and/or Group B, the reaction mixture is modified to include salts of all of the desired metals. For example, the mixture reacted in step (1) may be an aqueous mixture (solution) of copper nitrate, manganese nitrate and chromium trioxide.

In one embodiment, the reaction of step (1) is carried out by preparing two different solutions containing one or more of the required materials and thereafter either simultaneously mixing the two solutions or adding one solution to the other with agitation. For example, the reaction of step (1) can be carried out by contacting a first aqueous solution containing an acid salt of A with a second aqueous solution containing a base and an acid or acid salt of B. Alternatively, a first aqueous solution containing at least one acid salt of A and at least one acid or acid salt of B can be prepared and a second solution which is an aqueous alkaline solution can be prepared. These solutions can then be mixed simultaneously or by adding one to the other with agitation.

Specific examples of aqueous solutions which may be prepared and thereafter reacted with aqueous alkaline solutions include: a solution containing a copper salt and a water-soluble manganese salt such as a solution containing a mixture of copper nitrate and manganese nitrate; a solution containing a copper salt, a water-soluble manganese salt and chromic acid or a chromate salt such as a solution containing copper nitrate, manganese nitrate and chromic acid (or sodium dichromate).

The aqueous alkaline solutions may be aqueous solutions containing ammonium hydroxide, aqueous solutions prepared by dissolving sodium carbonate in water, aqueous solutions obtained by dissolving sodium or potassium hydroxide in water, aqueous solutions prepared by dissolving potassium carbonate in water, etc.

The pH of the reaction mixture obtained in step (1), when the reaction is conducted by simultaneously reacting the two solutions, generally is maintained in the range of from about 5 to about 10. In one preferred embodiment, a pH range of from about 7 to 9 is maintained.

The reaction of step (1) may be conducted in a batch or continuous manner. For example, the first and second solutions described above which are to be reacted together, may be added simultaneously and continuously to a small reactor containing water. Additional water may be added continuously to the reactor, or product slurry is recycled to the reactor. As the added materials react, the product precipitates and forms a slurry. Since the small reactor vessel is or soon becomes full to capacity, a portion of the slurry continuously is transported as effluent to a larger holding vessel. As noted, a portion of the slurry in the holding vessel can be recirculated to the reactor vessel, and/or a portion of the slurry in the holding vessel can be continuously withdrawn and the precipitate recovered.

Alternatively, the two solutions can be added simultaneously or separately to a reactor vessel and after a given period, agitation is terminated and the solid precipitate is recovered from the entire reaction mixture.

In some instances, it is desirable to allow the reaction mixture to digest after all of the reactants have been added to the reaction vessel. Digestion periods of from about 10 to 60 minutes appear to be sufficient to insure proper crystal growth.

The product of the reaction which is the precipitate can be recovered from the slurry by known techniques such as by filtration or centrifugation. Generally, the solids which are recovered are washed with water to remove water-soluble impurities including unreacted starting materials, and dried to remove most of the water. Drying can be accomplished at temperatures of from about 100° C. to about 150° C. for periods of from to about 24 hours or longer. The solid which has been recovered from the reaction mixture then is calcined at an elevated temperature above about 500° C. and generally at temperatures between about 500° C. and 1200° C. depending upon the particular pigment composition. Calcination temperatures of from about 700° C. to about 900° C. have been found to be particularly useful for many of the pigments prepared by the process of the invention. At these temperatures, calcination of the precipitate to form the desired pigment can be effected in a period of from a few minutes to one or two hours or more. Calcination at a temperature of about 750° C. for about 10 or 20 minutes generally is sufficient. Calcination can be accomplished utilizing any apparatus known in the art such as a rotary kiln, tunnel kiln, vertical calciner, high-temperature cyclone, etc.

The powdered material which is obtained as a result of the calcination step generally is pulverized to reduce the particle size range to more useful ranges. Any apparatus normally used for comminution of solid materials may be utilized including ball mills, hammer mill, etc.

A particularly preferred procedure for particle size reduction of the pigments of the present invention utilizes a fluid energy mill, often referred to in the art as a "jet mill". Such mills are available from, for example, Sturtevant Inc., Boston, Mass. Fluid energy mills available from Sturtevant are identified as Micronizer fluid energy mills, and these mills are capable of grinding and classifying solid powders in a single chamber wherein the particles, impelled by compressed gas, air or steam, move in high-speed rotation to grind each other by violent particle-to-particle impact. The centrifugal force keeps the oversized material in the peripheral grinding area, and centripetal force draws the preselected sized finds to the center for collection. The Micronizers available from Sturtevant include production as well as laboratory size mills. The particle size of the output can be controlled by the rate of feed and the propellant pressure.

The pigments of the present invention which are milled in a fluid energy mixer are characterized as having an average particle size of less than one micron will generally have average particle sizes of from about 0.2 to about 0.8 microns. These small particle pigments are found to have increased tinting strength.

The following examples illustrate the process and pigments of the present invention. Unless otherwise indicated in the examples and elsewhere in the specification and claims, all parts and percentages are by weight, temperatures are in degrees Celcius and pressures are at or near atmospheric pressure.

EXAMPLE 1

A first solution is prepared from 1200 parts of an aqueous copper nitrate solution containing 16.3% copper, 475.4 parts of an aqueous manganese nitrate solution containing 15% manganese, 442 parts of chromium trioxide and 1150 parts of water. A second solution is prepared by dissolving 674 parts of concentrated ammonium hydroxide (29% as $NH_3$) in 230 parts of water. The first and second solutions are added slowly and simultaneously with agitation along with water diluent to a reactor vessel which is connected to a larger holding vessel to allow effluent from the reactor to pass to the holding vessel. The reaction temperature is maintained at about 27° C. A precipitate is formed and is recovered from the slurry in the holding tank by filtration and washed with water. The residue is dried at about 130° C., and the dried material is then calcined at 750° C. for 10 minutes. The calcined product is the desired copper-chromium oxide pigment containing, by analysis, 34.1% copper, 31.1% chromium and 6.9% manganese.

EXAMPLE 2

A first solution is prepared by dissolving 1099 parts of an aqueous copper nitrate solution containing 16.3% copper, 572 parts of an aqueous manganese nitrate solution containing 15% manganese and 442 parts of chromium trioxide in 1150 parts of water. A second solution is prepared by dissolving 751 parts of concentrated aqueous ammonium hydroxide (29% as $NH_3$) solution in 251 parts of water. The first solution and 907 parts of the second solution are added slowly and simultaneously with agitation to a reactor vessel containing about 200 parts of water which is connected to a larger holding vessel to allow effluent from the reactor to pass to the holding vessel. The addition of both solutions is completed in about 30 minutes. A precipitate which is formed and is recovered by filtration of the slurry in the holding tank. The residue, after washing with water, is dried overnight in a forced air oven at 130° C. The recovered and dried precipitate is calcined at 750° C. for 10 minutes. The calcined precipitate is then comminuted in a fluid energy mill as described in Example 3. The pigment obtained is the desired copper-chromium pigment containing, by analysis, 9.14% manganese, 31.5% copper, and 31.1% chromium.

Figure 2:
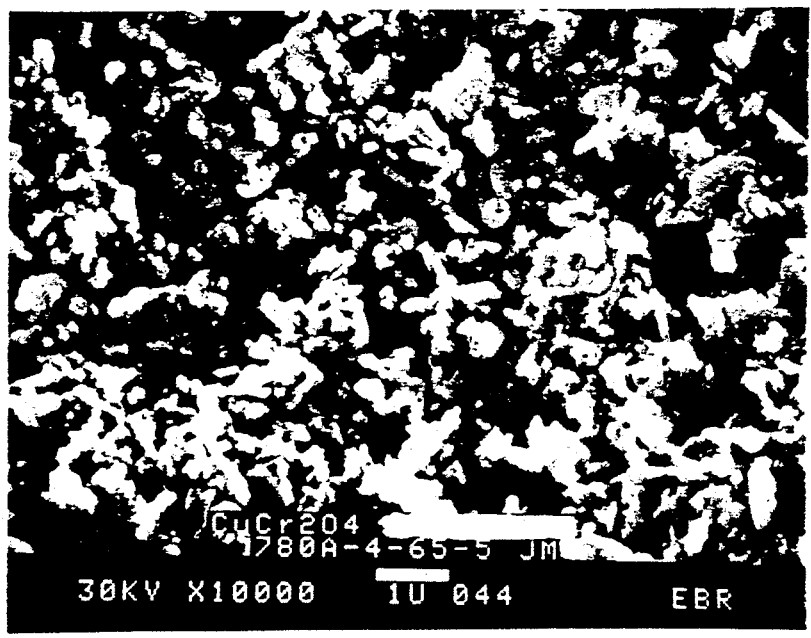
FIG. 2 is a view (magnified 10,000 times) of copper-chromium oxide pigment particles of the invention.

FIG. 2 is a view of the particles of this Example after jet milling as viewed with a camera attached to a scanning electron microscope at a magnification of 10,000 times the actual size of the particle. The irregularity of the particles is evident.

EXAMPLE 3

A first solution is prepared from 388.8 parts of ferric nitrate nonahydrate, 1305.2 parts of an aqueous chromium nitrate solution containing 11.4% chromium and 450 parts of water. The first solution and a second solution consisting of 1150 parts of concentrated ammonium hydroxide are added slowly and simultaneously with agitation to 200 parts of water in a reactor vessel at about 60° C. The reactor vessel is connected to a holding vessel to allow effluent from the reactor to pass to and collect in the holding vessel. In this Example a portion of the slurry is recycled to the reactor during the reaction. The pH of the reaction mixture is maintained at about 8.5 by adjusting the rate of addition of the ammonium hydroxide solution. Addition is completed in about 18 minutes, whereupon the contents of the reactor are added to the holding vessel, and agitation is continued for an additional 13 minutes. The slurry is filtered and washed with water. The filter cake is dried in an oven at 130° C. for 48 hours and is calcined at 750° C. for about 10 minutes. The calcined material is the desired product containing, by analysis, 18.1% iron and 50.3% chromium.

The average particle size of the calcined material is reduced by grinding the material in a fluid energy mill (i.e., Sturtevant Laboratory Series Micronizer-4 inch). The calcined feed material is placed in a funnel, and the opening of the funnel is directed to a trough. The trough is part of an electromagnetic vibratory feeder (a syntron) manufactured by FMC. As the material drops into the trough, it is conveyed to the jet mill's feed opening at a rate that is proportional to the energy of vibration. The amount of vibration is controlled by a single turn knob. A setting between 20 and 40 is used resulting in a feed rate of between 5 to 15 grams per minute. The material is then circulated in the jet mill, (5 to 15 seconds), until the appropriate particle size is reached. These small particles then drop into the collection bag.

FIG. 1 is a view of the particles of this Example after jet milling as viewed with a camera attached to a scanning electron microscope at a magnification of 10,000 times the actual size of the particle. The irregularity of the particles is evident.

EXAMPLE 4

A first solution is prepared by dissolving 253.3 parts of ferric nitrate nonahydrate and 850 parts of an aqueous chromium nitrate solution containing 11.4% chromium in 325 parts of water. A second solution is prepared by dissolving 557 parts of sodium carbonate in 1536 parts of water. The first and second solutions are added slowly and simultaneously with agitation to about 200 parts of water contained in a reactor vessel. The reactor is connected to a larger holding vessel (containing about 2000 parts of water) to allow effluent from the reactor to pass to the holding vessel. The reaction which is conducted at about 60° C., and the reaction mixture is maintained at a pH of about 8 by adjusting the rate of addition of the second solution. A precipitate is formed and is collected from the slurry on a funnel, washed, dried at 135° C., crushed and reslurried in water to remove excess sodium and then dried again at 135° C. The dried precipitate is calcined at 750° C. for 10 minutes in a muffle furnace, cooled and milled in a fluid energy mill. The pigment contains, by analysis, 14.7% iron and 40.5% chromium.

EXAMPLE 5

Chromium trioxide (572.3 parts) is dissolved in 900 parts of water, and 777.6 parts of ferric nitrate nonohydrate is dissolved in 1000 parts of water. These two solutions are combined and diluted with 450 parts of water. To a reaction vessel containing about 200 parts of water there are added 1665.7 parts of the above-prepared solution and 703.5 parts of concentrated aqueous ammonium hydroxide (29% as $NH_3$) slowly and simultaneously with agitation over a period of about 10 minutes. The precipitate is recovered by filtration, dried in an oven overnight at about 125° C. and calcined at about 750° C. for 10 minutes. The calcined precipitate is comminuted in a jet mill as described in Example 3 to produce pigment particles of the desired size.

EXAMPLE 6

A first solution is prepared by dissolving 388.8 parts of ferric nitrate nonahydrate and 1305.2 parts of an aqueous solution of chromium nitrate containing 11.4% chromium in 495 parts of water. A second solution is prepared by dissolving 1115 parts of sodium carbonate in 2999 parts of water. The first and second solutions are added slowly and simultaneously with agitation to a reactor vessel. The reactor vessel is connected to a larger holding vessel containing 3000 parts of water to allow effluent from the reactor to pass to the holding vessel. Slurry from the holding vessel is recycled to the reactor vessel during the reaction. The temperature within the reactor is maintained at about 53°–55° C. and the temperature in the holding vessel is about 60° C. A precipitate is formed in the reactor vessel and is carried to the holding vessel. After about 23 minutes, the slurry in the holding vessel becomes viscous, and after a total of 34 minutes of reaction, addition of the solution is terminated and the mixture is stirred an additional 10 minutes. At this time, all of the first solution has been added and 579 parts of the second solution remains. The solid material in the slurry is recovered by filtration, washed with water and dried in an oven overnight at 135° C. The dried material is calcined at 750° C. for 15 minutes, and the desired light-brown iron chromite pigment is recovered. The pigment contains, by analysis 12.5% iron and 34.4% chromium.

EXAMPLE 7

A first solution is prepared by dissolving 294.6 parts of chromium trioxide in 1080 parts of an aqueous manganese nitrate solution containing 15% manganese. A second solution is prepared by dissolving 500 parts of concentrated (29%) ammonium hydroxide in 168 parts of water. The first and second solutions are added slowly and simultaneously with agitation to the reactor vessel containing about 200 parts of water, and the reactor is connected to a larger holding vessel to allow effluent from the reactor to pass to the holding vessel. The temperature of the mixture in the reactor is about 28° C. during the reaction, and the temperature of the slurry in the holding vessel is between about 37° and 50° C. The addition of the two solutions is terminated after about 13 minutes and 83 parts of the second solution remains. The precipitate is recovered by filtration, washed with water and dried overnight at 130° C. The dried material is calcined at 750° C. for 30 minutes yielding a light-brown solid containing, by analysis, 37.2% manganese and 30.8% chromium.

EXAMPLE 8

A first solution is prepared by dissolving 472.9 parts of ferric nitrate nonahydrate, 460.7 parts of an aqueous chromium nitrate solution containing 11.4% chromium, 286.2 parts of zinc nitrate tetrahydrate in 2000 parts of water. A second solution comprises concentrated aqueous ammonium hydroxide(29% as $NH_3$). The two solutions are added slowly and simultaneously with agitation to a reactor vessel connected to a larger holding vessel as described in Example 1. Water is added to the reactor during the reaction. Addition of the two solutions to the reactor is completed in about 25 minutes at the pH of the reaction mixture is maintained between 7.5 and 8.5. The precipitate is recovered by filtration, dried in an oven at 100° C. overnight and passed through a lab crusher. The crushed particles are calcined at 650° C. for 15 minutes yielding the desired pigment containing, by analysis, 26.3% iron, 20.37% chromium and 26.1% zinc.

EXAMPLE 9

A first solution is prepared by mixing 601.6 parts of copper nitrate solution containing 16.3% copper, 130.7 parts of manganese nitrate solution containing 15.5% manganese, 195 parts of chromium trioxide and 551 parts of water. A second solution is prepared comprising 350 parts of aqueous concentrated ammonium hydroxide and 127.2 parts of water. The first and second solutions are added slowly and simultaneously with agitation to a reactor vessel which is connected to a larger holding vessel as described in Example 1. Water is added to the reactor as diluent during the reaction. Addition of the two solutions to the reactor is completed in about 12 minutes, and the pH of the mixture in the reactor is maintained at about 6 during the reaction. The pH of the slurry in the holding vessel is about 6.2–6.3 and the temperature is about 60° C. The precipitate is recovered by filtration, washed with water and calcined at about 800° C. for 10 minutes. The copper, manganese, chromium pigment obtained in this manner contains, by analysis, 5.5% manganese, 35.2% copper and 31.5% chromium.

EXAMPLE 10

A first solution is prepared from a mixture of 1099 parts of an aqueous copper nitrate solution containing 16.3% copper, 442 parts of chromium trioxide, 573 parts of an aqueous manganese nitrate solution containing 15.7% manganese and 1150 parts of water. A second solution is prepared from 118 parts of water and 343.9 parts of concentrated aqueous ammonium hydroxide. One-half of first solution and all of the second solution are added slowly and simultaneously with agitation to a reactor vessel which is connected to a larger holding vessel as described in Example 1 over a period of about 20 minutes as the pH of the mixture in the reaction vessel varies from about 6.5 to about 6.7. Water is used as a diluent as the reaction proceeds. The precipitate is recovered by filtration and the filtrate is washed with water and dried overnight at 150° C. Calcination at a temperature of about 750° C. yields the desired pigment.

EXAMPLE 11

A solution comprising 92.3 parts of chromium trioxide and 2176 parts of ferric nitrate nonahydrate in about 4100 parts of water is prepared and charged to a reactor vessel equipped with a stirrer. To the reactor there is then added, in a continuous manner, about 900 parts of concentrated (29%) aqueous ammonium hydroxide solution over a period of about 30 minutes as the temperature gradually increases from about 10° C. to about 45° C. Additional water is added to reduce the viscosity of the reaction mixture, and addition of the aqueous ammonium hydroxide is continued until an additional 310 parts of aqueous ammonium hydroxide has been added. The reaction mixture then is filtered, and the recovered solids are dried at about 150° C. for 15 hours. The solids are calcined at about 645° C. for about 18 minutes. The calcined product obtained in this manner contains, by analysis, 59.6% iron and 7.2% chromium.

The pigments of the present invention, which are treated in a fluid energy mill as described above are characterized as having high tinting strength and improved weather-resistance. Because of the high tinting strength, pigment loading levels in substrates such as polystyrene and polyvinyl chloride can be reduced significantly and yet produce pigmented materials having excellent color values. Copper-chromium oxide pigments containing manganese prepared as described above wherein the manganese concentration is from about 8 to about 12% by weight exhibit improved color values and tinting strength when compared to copper-chromium oxide pigments containing no manganese or lesser amounts of manganese. The presence of the manganese in the pigment also enhances the bluish character of the pigment.

Iron-chromium oxide pigments of the present invention also are characterized as having improved color values, and the color values are approximately equal to those exhibited by commercially available pigments containing four components such as zinc, chromium, aluminum and magnesium when let down to matching tint strength.

The pigments prepared by the process of the present invention also exhibit superior tinting strength when compared to pigments comprising the same components but prepared by mechanically mixing the solid components and calcining at elevated temperatures for longer periods of time. For example, when a brown iron-chromium oxide pigment is blended into rigid vinyl compound formulations including 1.5 parts commercial pigment and 10 parts $TiO_2$. The pigments of the present invention produce about equal color using only 0.36 parts of pigment.

The improved infrared reflectance properties of the pigments of the present invention is demonstrated by comparing the temperature rise of a rigid polyvinyl chloride panel upon exposure to infrared radiation. The temperature rise of a rigid PVC panel containing about 0.36 parts of a pigment of this invention (and 10 parts of $TiO_2$) is less than the temperature rise of a rigid PVC panel containing 1.5 parts of a commercial pigment and 10 parts of $TiO_2$.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A pigment of irregular-shaped particles comprising crystallites of the empirical formula $A_xB_yC_z$ wherein A is copper, iron, or manganese; B is chromium; C is oxygen, selenium, tellurium or sulfur; x is 1, 2 or 3; y is 2 or 3; and z is greater than 3; the crystallites have an average size of from about 75 to about 600 Angstroms; and the surface area of the pigment particles is greater than zero up to about 20 $m^2/g$.

2. The pigment of claim 1 wherein the surface area is greater than zero up to about 10 $m^2/g$.

3. A pigment of irregular-shaped particles comprising crystallites of the empirical formula $Cu_xCr_yO_z$ wherein x and y are 2, z is 5, the mole ratio of chromium to copper in the pigment is less than about 1.3 to 1, the crystallites have an average size of from about 75 to about 250 Angstroms, the surface area of the pigment particles is greater than zero up to about 20 $m^2/g$, and the pigment also contains from zero to about 20% of manganese or titanium.

4. The pigment of claim 3 containing from about 3 to about 12% by weight of manganese or titanium.

5. A pigment of irregular-shaped particles comprising crystallites of the empirical formula $A_xB_yC_z$ wherein A is copper, iron, or manganese; B is chromium, molybdenum; C is oxygen, selenium, tellurium or sulfur; x is 1, 2 or 3; y is 2 or 3; and z is greater than 3; the crystallites have an average size of from about 75 to about 600 Angstroms; the surface area of the pigment particles is greater than zero up to about 20 $m^2/g$, and the average particle size of the pigment particle is less than about one micron.

6. A pigment of irregular-shaped particles comprising crystallites of the empirical formula $Cu_xCr_yO_z$ wherein x and y are 2, z is 5, the average crystallite size is from about 75 to about 250 Angstroms, the surface area of the pigment particles is greater than zero up to about 20 $m^2/g$; and the average particle size of the pigment particle is less than about 1 micron, and the pigment also contains from zero to about 20% of manganese or titanium.

7. The pigment of claim 6 containing from about 3 to about 12% by weight of manganese or titanium.

8. A pigment of irregular-shaped particles comprising crystallites of the empirical formula $Cu_xCr_yO_z$ wherein x and y are 2, z is 5, the pigment also contains from about 3 to about 12% manganese, the average crystallite size is from about 100 to about 175 Angstroms, the surface area of the pigment particles is greater than zero up to about 20 $m^2/g$; and the average particle size of the pigment particle is less than about 1 micron.

9. A copper-chromium oxide pigment of irregular-shaped particles comprising crystallites of the empirical formula $Cu_2Cr_2O_5$ having an average crystallite size of from about 75 to about 250 Angstroms, said pigment also containing from zero to about 20% by weight of manganese and having a surface area of greater than zero up to about 20 $m^2/g$, wherein the mole ratio of chromium to copper in the pigment is less than about 1.3 to 1.

10. The copper-chromium oxide pigment of claim 9 further characterized as having an average particle size of less than one micron.

11. The copper-chromium oxide pigment of claim 9 further characterized as containing from about 3 to about 12% by weight of manganese or titanium.

12. The copper-chromium oxide pigment of claim 9 wherein the crystallite size is from about 100 to about 175 Å.

13. The copper-chromium oxide pigment of claim 9 wherein the surface area is greater than zero up to about 10 $m^2/g$.

14. The copper-chromium oxide pigment of claim 9 containing from about 8 to about 12% by weight of manganese.

15. An iron-chromium oxide pigment of irregular-shaped particles comprising crystallites of the formula $FeCr_3O_6$ having an average crystallite size of from about 100 to about 600 Angstroms and the particles have a surface area of greater than zero up to about 20 $m^2/g$.

16. The iron-chromium oxide pigment of claim 15 wherein the surface area is greater than zero up to about 10 $m^2/g$.

17. A pigment of irregular-shaped particles comprising crystallites of the empirical formula $FeCr_3O_6$ wherein the crystallites have an average size of from about 75 to about 600 Å; and the surface area of the pigment particles is greater than zero up to about 20 $m^2/g$.

18. A pigment of irregular-shaped particles comprising crystallites of the empirical formula $Cu_2Cr_2O_5$ wherein the crystallites have an average size of from about 75 to about 600 Å; and the surface area of the pigment particles is greater than zero up to about 20 $m^2/g$.

19. A pigment of irregular-shaped particles comprising crystallites of the empirical formula $Mn_2Cr_2O_z$ wherein z is greater than 3; the crystallites have an average size of from about 75 to about 600 Å; and the surface area of the pigment particles is greater than zero up to about 20 $m^2/g$.

* * * * *